United States Patent
Kulakowski et al.

(10) Patent No.: US 12,416,927 B2
(45) Date of Patent: Sep. 16, 2025

(54) TECHNOLOGY FOR CALCULATING STATIONARY WIND SPEED FROM A MOVING VEHICLE

(71) Applicant: INTERNATIONAL BUSINESS MACHINES CORPORATION, Armonk, NY (US)

(72) Inventors: Christopher A. Kulakowski, Austin, TX (US); Mauro Marzorati, Lutz, FL (US); Jeremy R. Fox, Georgetown, TX (US); Carolina Garcia Delgado, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 18/341,372

(22) Filed: Jun. 26, 2023

(65) Prior Publication Data
US 2024/0427338 A1    Dec. 26, 2024

(51) Int. Cl.
*G05D 1/00* (2024.01)

(52) U.S. Cl.
CPC .......... *G05D 1/1062* (2019.05); *G05D 1/0088* (2013.01)

(58) Field of Classification Search
CPC ..... G05D 1/1062; G05D 1/0088; G01W 1/02; B60W 30/00; G01P 5/00
See application file for complete search history.

(56) References Cited

U.S. PATENT DOCUMENTS

| | | | | |
|---|---|---|---|---|
| 3,800,128 A | * | 3/1974 | Kurk | G06G 7/78 708/809 |
| 7,557,735 B1 | * | 7/2009 | Woodell | G01S 13/953 356/450 |
| 2016/0341757 A1 | * | 11/2016 | Masucci | G01P 5/245 |
| 2018/0210447 A1 | * | 7/2018 | Myers | G08G 1/096855 |
| 2021/0181230 A1 | | 6/2021 | Haneda | |
| 2022/0126867 A1 | * | 4/2022 | Han | B60W 30/02 |
| 2022/0179096 A1 | * | 6/2022 | Hoehenberger | B60W 10/20 |

FOREIGN PATENT DOCUMENTS

| | | | |
|---|---|---|---|
| GB | 2559885 A * | 8/2018 | ................ G01P 5/26 |
| JP | 6729884 B6 | 8/2020 | |
| WO | 2022158387 A1 | 7/2022 | |

OTHER PUBLICATIONS

WO 2019073007 A1 with English translation; date filed Oct. 11, 2018; date published Apr. 18, 2019. (Year: 2019).*

(Continued)

*Primary Examiner* — Calvin Cheung
(74) *Attorney, Agent, or Firm* — Randy Tejeda

(57) ABSTRACT

A vehicle and/or fleet of vehicles that are equipped with: (i) a wind velocity detection device (for example, an ultrasonic wind velocity detection device); and (ii) a vehicle velocity detection device (for example, lidar or a speedometer and compass). Computer hardware performs two dimensional, or three dimensional, vector calculations in order to net out a stationary wind velocity from the measurements made at each vehicle. The computer hardware and software for performing the vector calculations and outputting stationary wind speed may be located in the vehicle or remotely from it (for example, at the headquarters of a weather prediction company).

18 Claims, 5 Drawing Sheets

(56) References Cited

OTHER PUBLICATIONS

KR 20140060248 A with English translation; date filed Nov. 8, 2013; date published May 19, 2014. (Year: 2014).*
Jp H06201713 A with English translation; date filed Dec. 30, 1992; date published Jul. 22, 1994. (Year: 1994).*
DE 102012215623 A1 with English translation; date filed 2012-09-04; date published 2014-03-06. (Year: 2014).*
DE 102016225856 A1 with English translation; date filed Dec. 21, 2016; date published Jun. 21, 2018. (Year: 2018).*
"LeddarVision—LeddarTech", Downloaded from the Internet on Feb. 27, 2023, 6 pgs., <https://leddartech.com/leddarvision/?utm_term=autonomous%20vehicle20perception&utm_campaign=LeddarVision&utm_source=adwords&utm_medium=ppc&hsa_acc=1395223153&hsa_cam=12342818838&hsa_grp=117258683029&hsa_ad=586744867859&hsa_src=g&hsa_tgt=kwd-353136743711&hsa_kw=autonomous%20vehicle%20perception&hsa_mt=b&hsa_net=adwords&hsa_ver=3&gclid=EAlalQobChMIm9angrXg-.
"Lunewave, Inc.", IBM, Downloaded from the Internet on Feb. 27, 2023, 9 pgs.,<https://www.ibm.com/case-studies/lunewave-inc-watson-ai-building-sensors-for-autonomous-vehicles>.
"Statics Lecture: 2D Cartesian Vectors", UWMC Engineering, YouTube, Sep. 4, 2015, 4 pgs., <https://www.youtube.com/watch?v=YEDVL3XcIM8>.
"Wind Speed Calculator", Wind Calculator, Easy Unit Converter, Downloaded from the Internet on Feb. 27, 2023, 4 pgs., <https://www.easyunitconverter.com/wind-speed-calculator>.

\* cited by examiner

TECHNOLOGY FOR CALCULATING STATIONARY WIND SPEED FROM A MOVING VEHICLE

BACKGROUND

The present invention relates generally to the field of calculating wind speed, and more particularly to calculating wind speed (relative to the stationary ground) directly from a moving ground vehicle.

Large vehicles such as semi-trucks and recreational vehicles carry more surface area then traditional passenger vehicles. This surface area can behave as a sail at times making stability and control of the vehicle unsafe in high winds. Typically, cross winds are the most dangerous to large vehicles and sometimes can go unnoticed until too late when the wind causes the vehicle to turn over on its side.

Some terminology relevant to the present invention will now be discussed. When a vehicle is travelling and it measures wind speed/direction, then the measured wind speed/velocity will typically have two components packed into the determined wind speed as follows: (i) the vehicle travel direction/speed; and (ii) the speed/direction of the wind. Herein, this type of wind speed/direction may be referred to as "vehicle-based wind velocity" (a vector value including "vehicle based wind speed" and "vehicle based wind direction"). Conventional technology for determination of vehicle based wind velocity may include 2D (wind speed assumed parallel to the ground surface) and 3D systems (wind velocity may have vertical component that varies over the height dimension). "Stationary wind velocity" (or "ground wind velocity") is a term used herein to refer to only the speed/direction of the wind and includes no component caused by the motion of the vehicle that mounts equipment to measure wind speed.

The Wikipedia entry for "Lidar" (as of 3 Apr. 2023) states in part as follows: "Lidar (also LIDAR, or LiDAR; sometimes LADAR) is an acronym of 'light detection and ranging' or 'laser imaging, detection, and ranging'. It is a method for determining ranges by targeting an object or a surface with a laser and measuring the time for the reflected light to return to the receiver. It is sometimes called 3-D laser scanning, a special combination of 3-D scanning and laser scanning. LIDAR has terrestrial, airborne, and mobile applications. [Lidar] has also been increasingly used in control and navigation for autonomous cars. . . . Doppler lidar systems are also now beginning to be successfully applied in the renewable energy sector to acquire wind speed, turbulence, wind veer, and wind shear data. . . . Lidar speed guns [devices] are used by the police to measure the speed of vehicles for speed limit enforcement purposes." (footnotes omitted)

Note on terminology: vehicle velocity detection systems that rely on reflected radiation to measure vehicle speed and/or vehicle direction of travel will herein be referred to as "reflected radiation speed sensors (RRSS)": Lidar is a specific type of RRSS that uses reflected visible light wavelengths.

The Wikipedia entry for "ultrasonic transducer" (as of 3 Apr. 2023) states in part as follows: "Ultrasonic transducers and ultrasonic sensors are devices that generate or sense ultrasound energy. They can be divided into three broad categories: transmitters, receivers and transceivers. Transmitters convert electrical signals into ultrasound, receivers convert ultrasound into electrical signals, and transceivers can both transmit and receive ultrasound. Ultrasound can be used for measuring wind speed and direction (anemometer)."

SUMMARY

According to an aspect of the present invention, there is a method, computer program product and/or system, for use with a vehicle equipped with a vehicle velocity detection device and a vehicle-based wind velocity detection device, that performs the following operations (not necessarily in the following order): (i) receiving a vehicle-based wind velocity from the vehicle-based wind velocity device; (ii) receiving a vehicle velocity from the vehicle velocity detection device; and (iii) calculating, by a processor, a stationary wind velocity value by vector subtracting the vehicle velocity from the vehicle-based wind velocity.

Various embodiments of the present invention may include one, or more, of the following features, characteristics, advantages and/or operations: (i) the vehicle-based wind velocity, the vehicle velocity and stationary wind speed are calculated as two dimensional vectors in a plane parallel to a travel surface upon which the vehicle is travelling; (ii) the vehicle is an unmanned aerial vehicle that flies through the air; (iii) the vehicle is a ground vehicle that travels on wheels over the ground; (iv) the vehicle velocity detection device includes uses lidar hardware and techniques; and/or (v) the vehicle-based wind velocity detection device includes uses ultrasonic hardware and techniques.

DETAILED DESCRIPTION

Figure 1A:
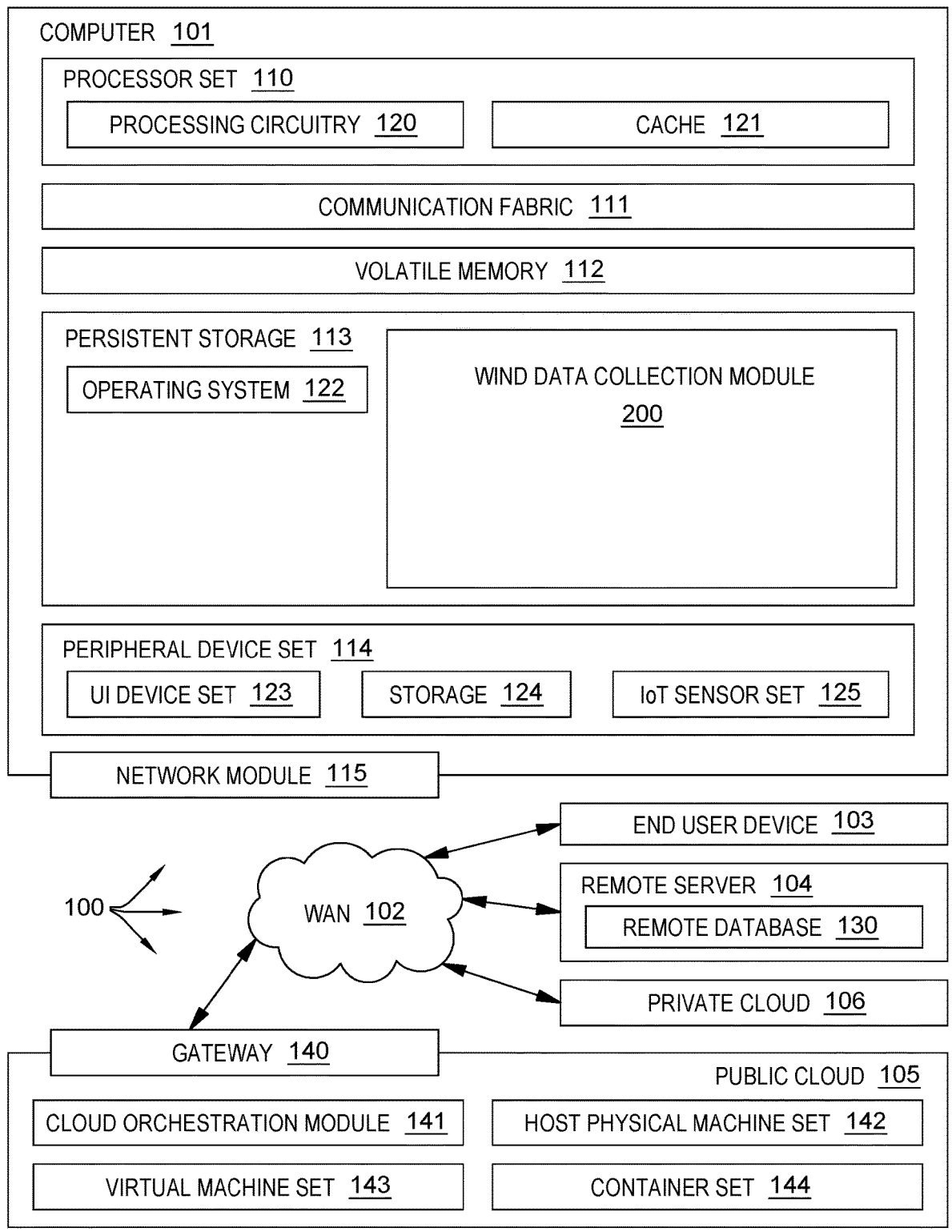
FIGS. 1A and 1B, taken together, form a block diagram of a first embodiment of a system according to the present invention.

In some embodiments of the present invention, a vehicle and/or fleet of vehicles that are equipped with: (i) a wind velocity detection device (for example, an ultrasonic wind velocity detection device); and (ii) a vehicle velocity detection device (for example, lidar or a speedometer and compass). Computer hardware performs two dimensional, or three dimensional, vector calculations in order to net out a stationary wind velocity from the measurements made at each vehicle. The computer hardware and software for performing the vector calculations and outputting stationary wind speed may be located in the vehicle or remotely from it (for example, at the headquarters of a weather prediction company).

Detailed Description section is divided into the following subsections: (i) The Hardware and Software Environment; (ii) Example Embodiment; (iii) Further Comments and/or Embodiments; and (iv) Definitions.

I. The Hardware and Software Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As shown in the first Figure of this document, computing environment 100 contains an example of an environment for the execution of at least some of the computer code involved in performing the inventive methods, such as wind data collection mod 200 (also herein sometimes referred to as block 200). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

II. Example Embodiment

Figure 1B:
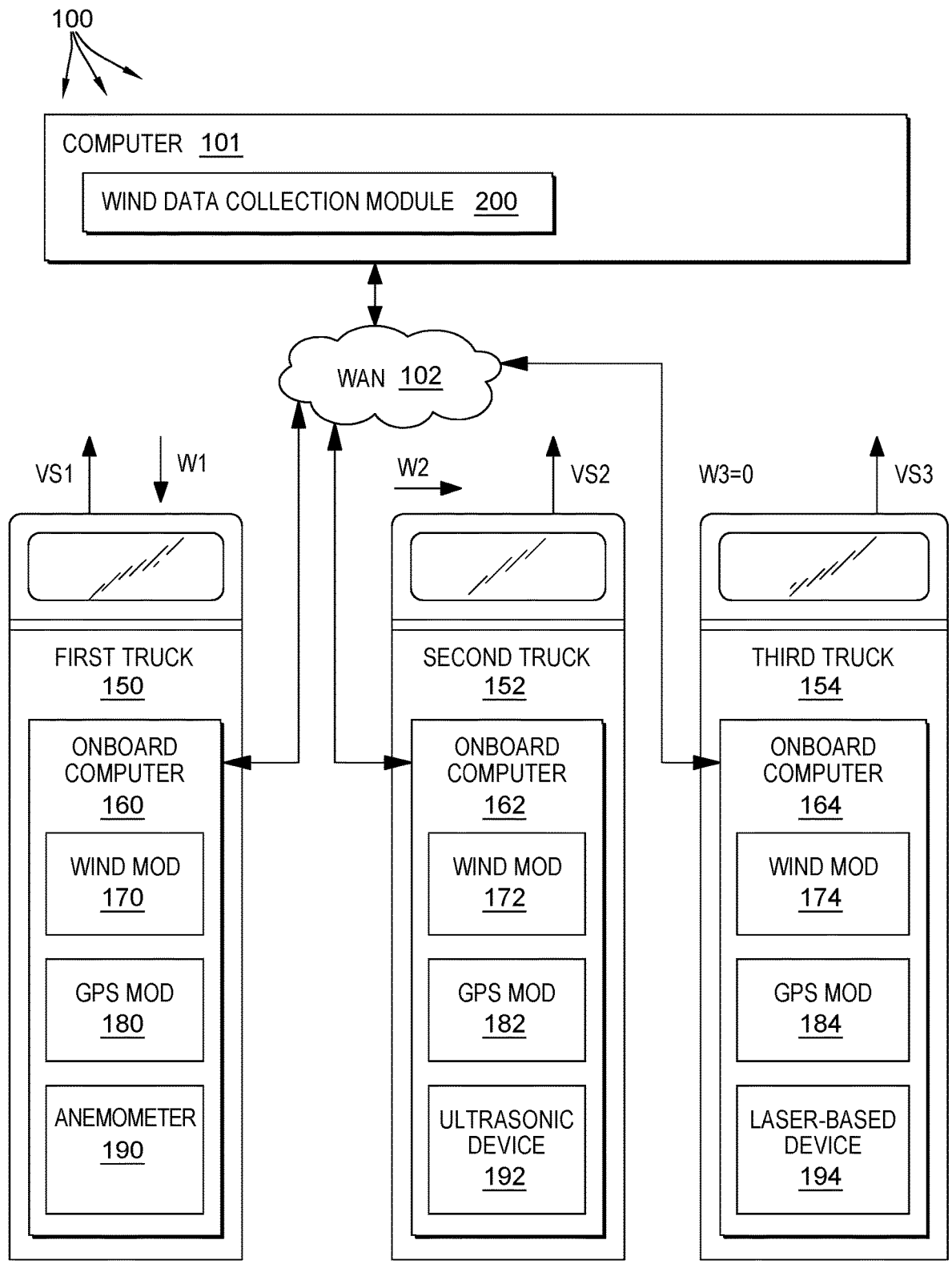

FIG. 1B shows additional components of computing environment 100 as follows: first truck 150, second truck 152 and third truck 154. First truck 150 includes onboard computer 160, wind mod 170, GPS mod 180 and anemometer 190. Second truck 152 includes onboard computer 162, wind mod 172, GPS mod 182 and ultrasonic device 192. Third truck 154 includes onboard computer 164, wind mod 174, GPS mod 184 and laser based device 194.

Figure 2:
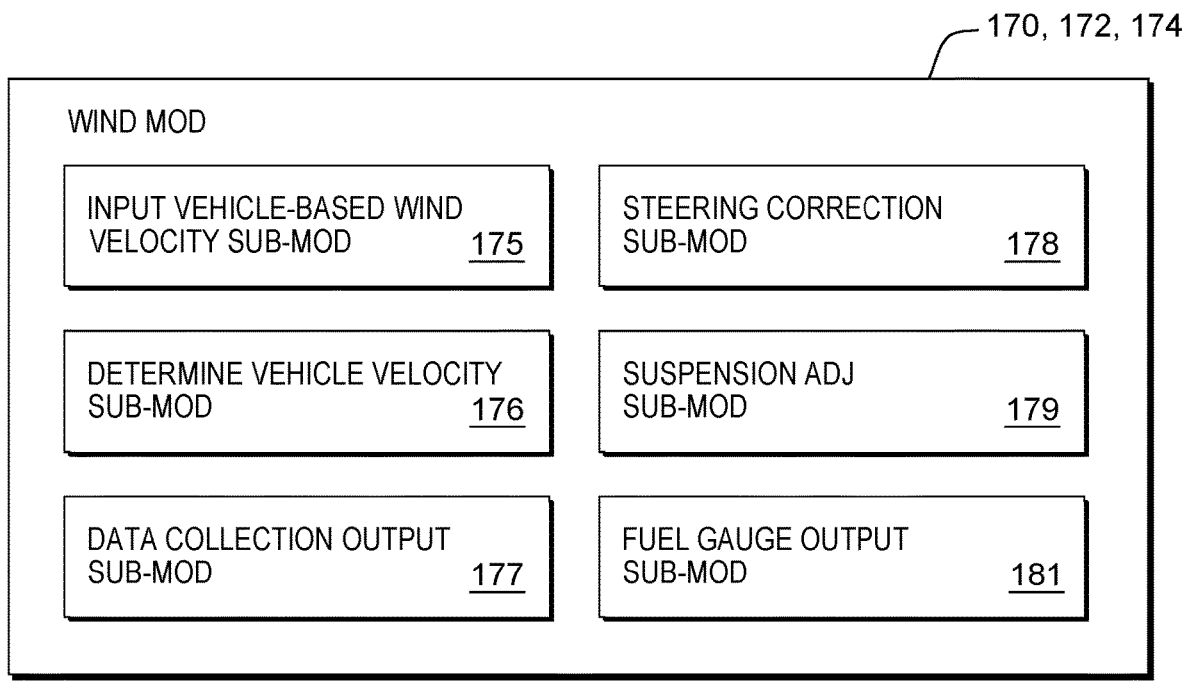
FIG. 2 is a block diagram showing a machine logic (for example, software) portion of the first embodiment system.
Figure 3:
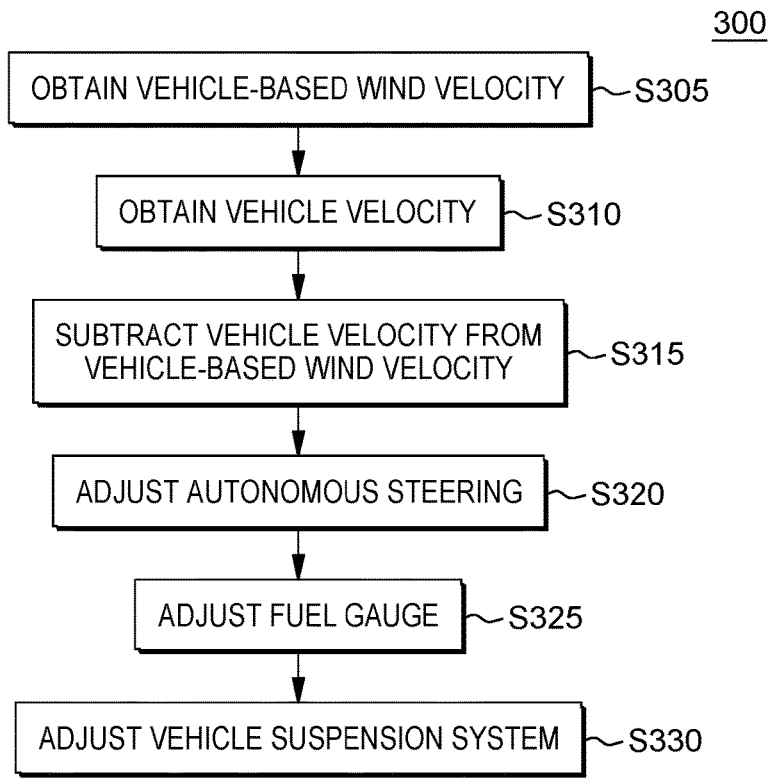
FIG. 3 is a flowchart showing a first embodiment method performed, at least in part, by the first embodiment system.

Computing environment 100 is an environment in which an example method according to the present invention can be performed. As shown in FIG. 3, flowchart 300 shows an example method according to the present invention. As shown in FIG. 2, wind data collection module ("mod") 200 and wind mods 170, 172, 174 work co-operatively to perform and control performance of at least some of the method operations of flowchart 300. This method and associated software will now be discussed, over the course of the following paragraphs, with extensive reference to the blocks of the first three figures.

Processing begins at operation S305, where input vehicle-based wind velocity sub-mods 175 in each of wind mods 170, 172, 174 (respectively of trucks 150, 152 and 154) respectively receive vehicle-based wind velocity from the respective wind velocity detection devices of the trucks. More specifically: (i) the vehicle-based velocity device of truck 150 is in the form of anemometer 190 which uses a mechanical weather vane and three-cup anemometer (not separately shown) and the vehicle-based wind velocity at truck 150 is in a direction parallel to truck 150, with a magnitude of |VS1+W1|; (ii) the Vehicle-Based Velocity Device of Truck 152 is in the form of ultrasonic device 192, and the vehicle-based wind velocity at truck 152 is in substantially southeastern direction, with a magnitude of the square root of the following quantity: W2 squared plus VS2 squared; (iii) the vehicle-based velocity device of truck 154 is in the form of laser based device 194 (for example, a lidar device for measuring wind velocity with high precision), and the vehicle-based wind velocity at truck 154 is in a direction opposite that of arrow VS3, with a magnitude of VS3.

Processing proceeds to operation S310, where determine vehicle velocity sub-mod 176 determines the speed and direction in which each vehicle is travelling. In this example they are all travelling due north as shown by arrows VS1, VS2 and VS3 in FIG. 1B. Sub-mod 176 determines vehicle velocity using inputs over time from GPS (global satellite positioning) mods 180, 182 and 184. Alternatively, other types of vehicle driving velocity detection devices may be used, such a lidar device or the input to the speedometer (velocity magnitude) and a compass (velocity direction).

Processing proceeds to operation S315, where data collection output sub-mod 177 subtracts the vehicle velocity determined at operation S310 from the vehicle-based wind velocity obtained at operation S315 to obtain a stationary wind velocity. In this embodiment, the vector calculations are based on two orthogonal dimensions (NS/EW), but the system can be three dimension with up down components and also other types of co-ordinate axes may be used (for example, spherical co-ordinate system). Data collection output sub-mod 177 also outputs the stationary wind velocities for the three trucks to wind data collection mod 200 of computer 101, which is a computer of a weather company, located with their servers. The three vehicles make up a sort of ad hoc vehicle-net, by both hauling cargo, but also reporting stationary wind speeds back to the weather company as they crisscross the nation doing pick-ups and making deliveries. In this way, the weather company gets a lot more data on wind speeds than they otherwise would and this can help predict the weather and for providing training data sets so that artificial intelligence systems can be trained on how to predict weather.

Processing proceeds to operation S320, where steering correction mod 178 corrects vehicle steering based, at least in part, on the instantaneous stationary wind velocity. Because truck 154 is driven by computer, this data is used to actually steer the truck. In the other vehicles, this data is used to activate warnings and/or switch to autonomous mode driving if certain operation thresholds are met (for example, dangerously high winds).

Processing proceeds to operation S325, where suspension adjustment sub-mod 179 corrects the stiffness of the suspension of trucks 150, 152, 154 based, at least in part, on the instantaneous stationary wind velocity.

Processing proceeds to operation S330, where fuel gauge output sub-mod 181 corrects the calibration of the fuel gauges of trucks 150, 152, 154 based, at least in part, on the instantaneous stationary wind velocity.

III. Further Comments and/or Embodiments

The following three (3) paragraphs respectively set forth some examples of applications where various embodiments of the present invention may be useful for determining stationary wind speed (sometimes herein referred to as "ground wind speed").

WEATHER DATA COLLECTION EXAMPLE: Connected vehicles sending telemetry to cloud weather infrastructure or to a "vehicle-net" for situational awareness. Generally speaking, ground wind speed/direction (that is, stationary wind velocity) is a better heuristic for making weather predictions than vehicle based wind velocity.

VEHICLE HARDWARE CONTROL EXAMPLE: In measurements of vehicle-based wind velocity experienced by a vehicle with a direct tail wind equal to its forward driving velocity, then the measurement would be 0 mph, for example, because of the motion of the vehicle and the wind speed effectively cancel each other out. If that vehicle slows and takes a right turn its now subject to the force of the ground wind speed which may result in an accident but could have been predicted with a measure of true stationary wind velocity. Accordingly, the stationary wind velocity can be useful in performing the driving operations (in this example, steering) of an autonomous vehicle. For example, the brakes may be applied so that the turn is made more slowly to enhance instantaneous vehicle stability as the turn is completed and the forward driving direction becomes orthogonal with the prevailing wind.

UNMANNED AERIAL VEHICLE (UAV) EXAMPLE: Some embodiments of the present invention are directed to aeronautical and nautical applications and work similarly to the autonomous ground vehicle example set forth in the previous paragraph. Airplanes/helicopters use two measurements in flight, airspeed and ground speed, which is a similar application where the wind speed is subtracted from the ground speed to get the air speed. Likewise, for the nautical world, there is boat speed through water (STW) and speed over ground (SOG) which similarly is subtracting the wind and water current variables to calculate the speed over ground. One aspect of UAV applications is that fleets of UAVs, made according to the present invention, can be sent out to collect instantaneous (or average over time) stationary wind velocity at various points in the atmosphere and/or along various paths through the atmosphere. For example, a UAV may travel slowly up and down in a geosynchronous manner to obtain stationary wind velocity at various heights above the ground. Fleets of autonomous water craft may also be used. In more complex embodiments the autonomous watercraft may each carry one or more UAVs according to the present invention in order to more efficiently cover large areas out at sea to obtain inputs for a water-based vehicle-net according to the present invention.

To solve for wind speeds encountered by a moving vehicle, there are existing solutions to solve for the problem above, however they require extremely expense sensory and equipment that costs thousands of dollars, are extremely bulky in size, heavy, and typically only seen in meteorology vehicles. It is not feasible for such technology to be used recreationally or for the trucking industry.

A method according to an embodiment of the present invention of determining wind speed and direction while in a moving vehicle, using new variables that are not utilized today, will be set forth in this paragraph. The method includes the following operations (not necessarily in the following order): (i) using vehicle mounted ultra-sonic wind sensors to detect the direction and wind speed (while in motion); (ii) using vehicle mounted LIDAR (light detection and ranging) technology to detect speed of the vehicle; (iii) using a compass to detect direction of travel; and (iv) combining these three measurements, noted above, to calculate the winds ground speed and direction, as if the vehicle was not in motion at all.

This method can be used to determine wind speed and direction that is not tainted by the variable of wind due to a vehicle in motion. Therefore, the measurement can be applied to safety controls in the vehicle, such as a high wind warning, decreasing or increasing tire pressure for improved traction and control, as well as harvesting and sharing via cloud real time wind data with weather forecasters, other travelers, and vehicle manufacturers about vehicle performance in high winds.

In embodiments that use ultrasonic sensors to determine wind speed, the ultrasonic sensors may be placed on the highest and lowest points of the vehicle's shape. These ultrasonic sensors, taken as a group working co-operatively with each other, will help to identify the direction and wind speed through differential readings as between individual pairs of ultrasonic sensors.

Figure 4:
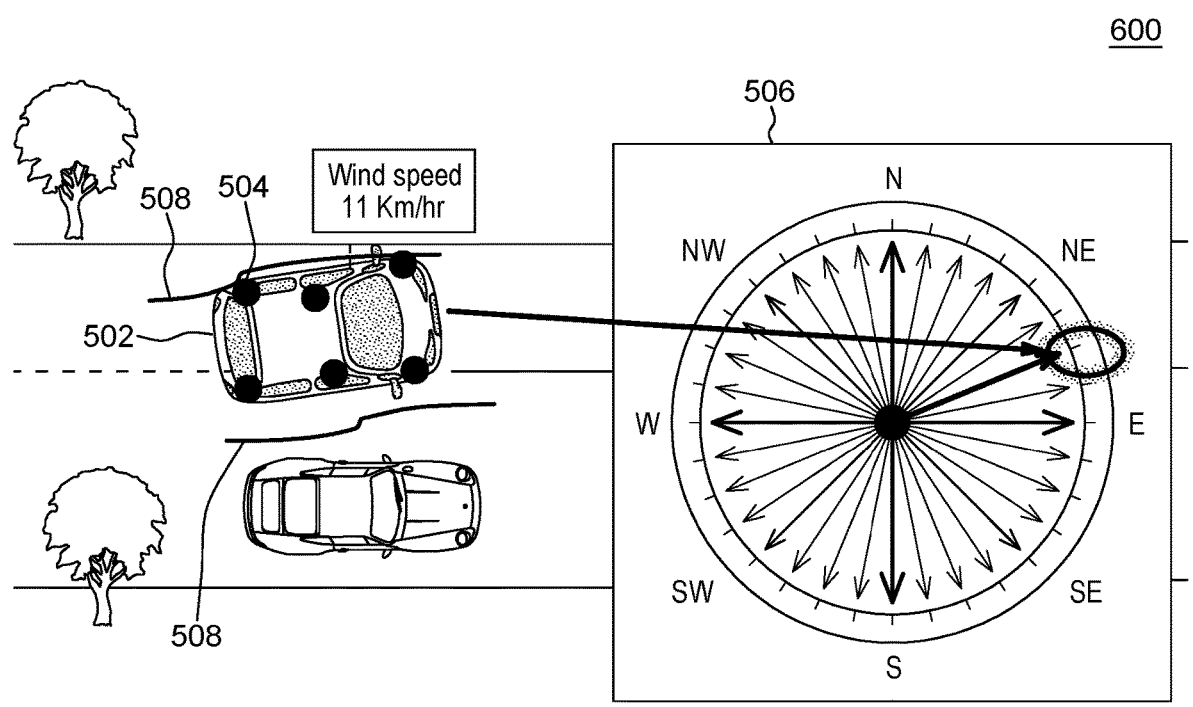
FIG. 4 is a top view of a second embodiment of a system according to the present invention.

As shown in FIG. 4, use environment 600 includes: vehicle 502 and wind heading lines 508. Vehicle 502 is equipped with ultrasonic wind sensors 504 and compass 506. In this embodiment, ultrasonic wind sensors 506 (including any associated control software) determine the vehicle based wind velocity, while compass 506 determines vehicle direction so that vehicle velocity can be determined in connection with vehicle speed detection hardware (not separately shown in FIG. 4). Based on these inputs, the ground based wind velocity (that is, wind speed and wind direction) is determined and utilized in one or more of the various manners disclosed in this document.

Figure 5:
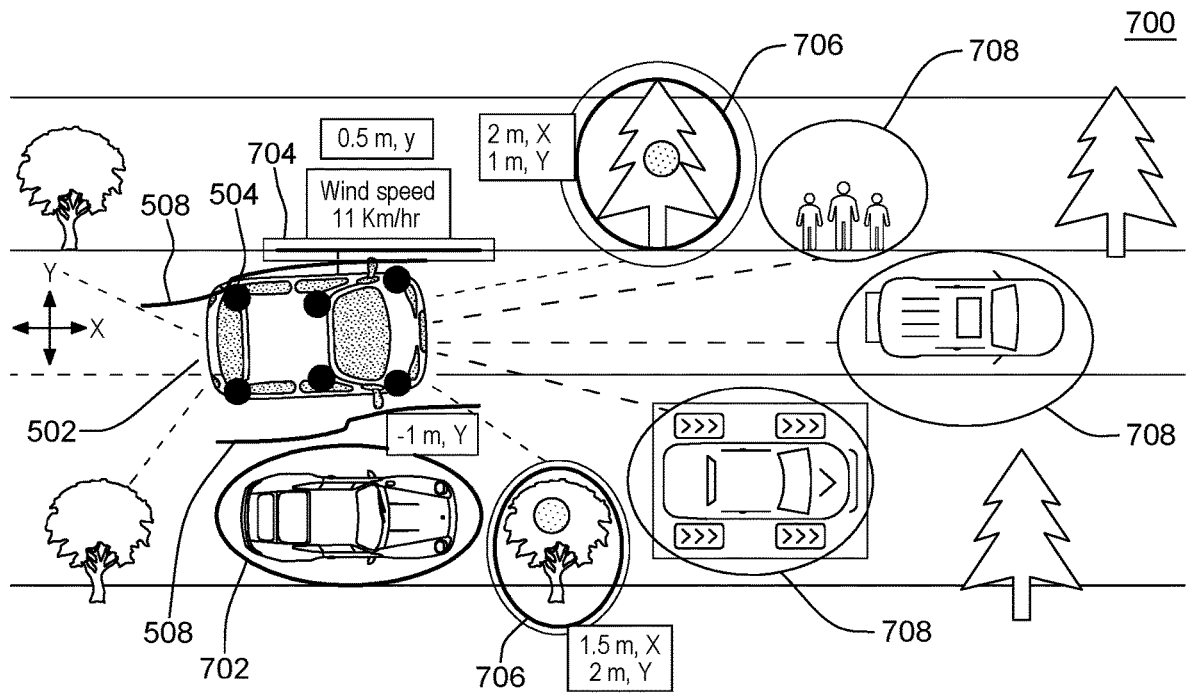
FIG. 5 is a top view of a third embodiment of a system according to the present invention.

As shown in FIG. 5, use environment 700 includes: vehicle 502, sensors 504, wind heading lines 508, near item 702 (in this example an adjacent vehicle), edge of highway hardware 704, middle distance items 706 and far distance items 708. LIDAR vehicle speed/direction technology is used to determine distances of the objects or items around the vehicle 702, 704, 706, 708. The objects are grouped into the following three groups: (i) near the vehicle 702, (ii) middle distance objects 706, and (iii) far distance objects 708. The distance of each item will be represented in two-dimensional Cartesian coordinates X and Y axes considering the origin (0, 0) the center of the vehicle.

Figure 6:
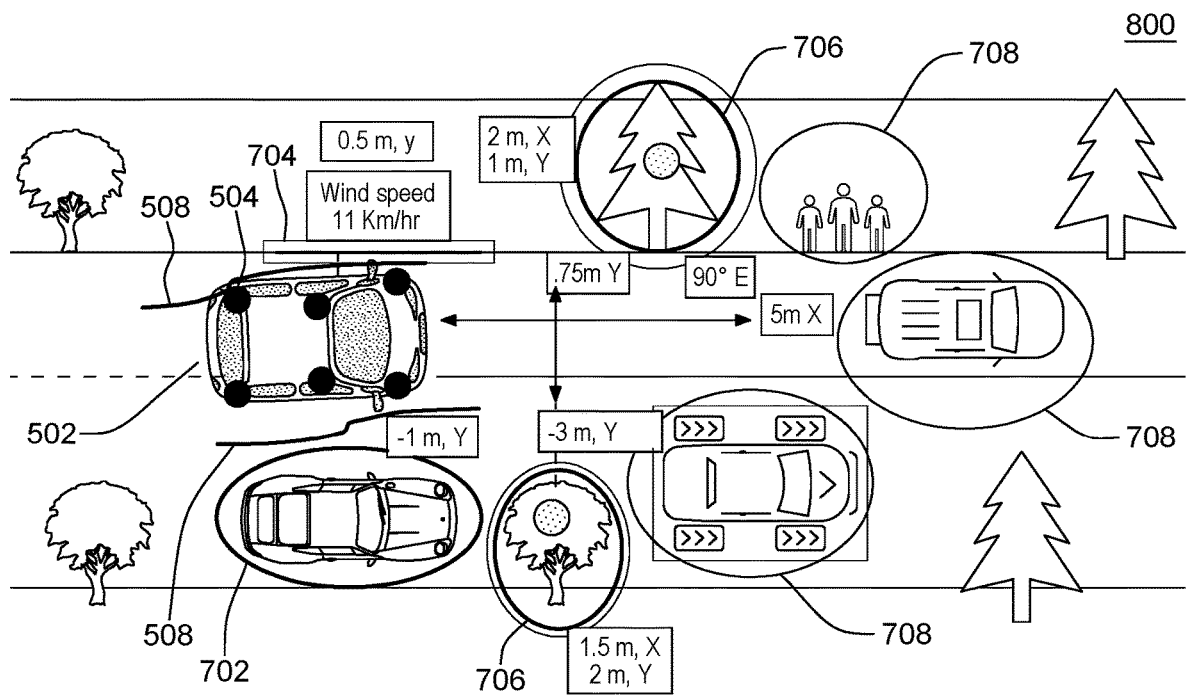
FIG. 6 is a top view of a fourth embodiment of a system according to the present invention.

As shown in FIG. 6, use environment 800 is similar to use environment 700, but use environment 800 shows distances calculated by an embodiment of the present invention based upon the distances to various objects 702, 704, 706, 708 determined by Lidar. To calculate the speed of the vehicle, the following items will be considered to perform Cartesian vector addition: (1) wind speed in this case 11 km/hr (3 m/s) and heading of 70°; (2) using a compass, there is a difference of −20°, between the vehicle 502 and wind headings 508, that needs adjustment for alignment; (3) the distance of the objects, in this case roadside edge 704, 0.5 m Y (see FIG. 6 at item 702) and −1 m Y (vehicle 502) to the edge of highway 704. Based on these two items, the distance that the vehicle needs to move in Y is 0.75 m, considering in X vehicle can move 5 m; and (4) considering these two movements X and Y, the speed that the vehicle needs to have is 5 m/s (18. Km/h) to nullify the effects of the wind.

Eight (8) equations related to Coplanar Vector Addition are now set forth:

$$\overline{F}_1 = F_{1x}\overline{i} + F_{1y}\overline{j} \qquad \text{(Equation 1)}$$

$$\overline{F}_2 = F_{2x}\overline{i} + F_{2y}\overline{j} \qquad \text{(Equation 2)}$$

$$\overline{F}_3 = F_{3x}\overline{i} + F_{3y}\overline{j} \qquad \text{(Equation 3)}$$

$$F_{Rx} = F_{1x} - F_{2x} + F_{3x} \qquad \text{(Equation 4)}$$

$$F_{Ry} = F_{1y} + F_{2y} - F_{3y} \qquad \text{(Equation 5)}$$

$$F_r = \sqrt{F_{Rx}^2 + F_{Ry}^2} \qquad \text{(Equation 6)}$$

-continued $$\vec{F}_R = F_{rx}\vec{i} + F_{Ry}\vec{j} \quad \text{(Equation 7)}$$

$$\theta = \tan^{-1}\left(\frac{F_{Ry}}{R_{Rx}}\right) \quad \text{(Equation 8)}$$

As will be appreciated by those of skill in the art, these Equations (1) to (8) can be plotted on cartesian graphs to separated shown X and Y components on the vectors involved.

Constant Windage and Calculation Formula Approach: In a preferred embodiment, the LIDAR considers the location of the items on the terrain that would act as wind blocking elements. In such embodiments the calculations are done for upcoming vehicle positions assuming constant wind, to adjust the recommended travel speed when approaching the position.

UAV (Unmanned Aviation Vehicle) Implementation: Utilizing the similar type of approach, we could apply this same concept to a moving UAV (that is if), the UAV would be flying at a low enough altitude to have the necessary engagement with other types of factoring and calculation objects that are participating within the overall process.

A method according to an embodiment of the present invention for determining speed and direction of wind while in a moving vehicle includes the following operations (not necessarily in the following order): (i) detecting, by an ultra-sonic wind sensor, a direction and a wind speed while a vehicle is in motion; (ii) detecting, by LIDAR technology, a speed of the vehicle; (iii) identifying a direction of travel for the vehicle; (iv) calculating a ground speed of the wind and the direction of the wind, based on the detected direction and wind speed, detected speed of the vehicle, and direction of the vehicle so that the output calculation negates the motion of the vehicle; (v) applying the calculation to safety controls in the vehicle; (vi) aggregating and sharing, by a cloud network, real time wind data with weather forecasters, other travelers, and vehicle manufacturers about vehicle performance in high winds; and (vii) wherein the safety controls in the vehicle comprise: high wind warning, and decreasing or increasing tire pressure for improved traction and control.

Some embodiments of the present invention may include one, or more, of the following operations, features, characteristics and/or advantages: (i) combines ultra-sonic wind sensors, LIDAR technology, and a compass to calculate the wind speed and direction; (ii) detects the presence of wind gusts and updates the driving path dynamically; (iii) adjusts the heading of the vehicle in an autonomous mode or driver-controlled mode; and (iv) can be used for safety controls in the vehicle, such as a high wind warning, decreasing or increasing tire pressure for improved traction and control, as well as harvesting and sharing via cloud real time wind data with weather forecasters, other travelers, and vehicle manufacturers about vehicle performance in high winds.

Some embodiments of the present invention may include one, or more, of the following operations, features, characteristics and/or advantages: (i) uses a combination of ultra-sonic wind sensors, LIDAR technology and a compass to calculate the winds ground speed and direction, as if the vehicle was not in motion at all; (ii) utilizes a combination of different technologies and incorporates the use of a compass to detect the direction of travel and LIDAR technology to detect the speed of the vehicle; (iii) allows for a more accurate calculation of the wind speed and direction while the vehicle is in motion; (iv) utilizes three measurements, ultra-sonic wind sensors, LIDAR technology and a compass to calculate the wind's ground speed and direction, as if the vehicle is not in motion; (v) considers the speed of the vehicle and the position of other objects in the environment to account for the effects of wind created by the velocity of the vehicle; (vi) calculates wind speed and direction in a three-dimensional (3D) space; (vii) provides a more accurate measurement of wind speed and direction; and/or (ix) calculates wind speed and direction that is not tainted by the variable of wind due to a vehicle in motion.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Set of thing(s): does not include the null set; "set of thing(s)" means that there exist at least one of the thing, and possibly more; for example, a set of computer(s) means at least one computer and possibly more.

What is claimed is:

1. A computer-implemented method (CIM) for use with a vehicle equipped with a vehicle velocity detection device and a vehicle-based wind velocity detection device, the CIM comprising:
   receiving a vehicle-based wind velocity from the vehicle-based wind velocity device;
   receiving a vehicle velocity from the vehicle velocity detection device;
   calculating, by a processor, a stationary wind velocity value by vector subtracting the vehicle velocity from the vehicle-based wind velocity; and
   adjusting driving operations associated with the vehicle utilizing the calculated stationary wind velocity.

2. The CIM of claim 1 wherein the vehicle-based wind velocity, the vehicle velocity and stationary wind speed are calculated as two dimensional vectors in a plane parallel to a travel surface upon which the vehicle is travelling.

3. The CIM of claim 1 wherein the vehicle is an unmanned aerial vehicle that flies through the air.

4. The CIM of claim 1 wherein the vehicle is a ground vehicle that travels on wheels over the ground.

5. The CIM of claim 1 wherein the vehicle velocity detection device uses lidar hardware and techniques.

6. The CIM of claim 1 wherein the vehicle-based wind velocity detection device includes uses ultrasonic hardware and techniques.

7. A computer program product (CPP) for use with a vehicle equipped with a vehicle velocity detection device and a vehicle-based wind velocity detection device, the CPP comprising:
- a set of storage device(s) with each storage device including at least one type of data storage medium; and
- computer code stored collectively in data storage media of the set of storage device(s), with the computer code including data and instructions to cause a processor(s) set to perform at least the following operations:
  - receiving a vehicle-based wind velocity from the vehicle-based wind velocity device;
  - receiving a vehicle velocity from the vehicle velocity detection device;
  - calculating a stationary wind velocity value by vector subtracting the vehicle velocity from the vehicle-based wind velocity; and
  - adjusting driving operations associated with the vehicle utilizing the calculated stationary wind velocity.

8. The CPP of claim 7 wherein the vehicle-based wind velocity, the vehicle velocity and stationary wind speed are calculated as two dimensional vectors in a plane parallel to a travel surface upon which the vehicle is travelling.

9. The CPP of claim 7 wherein the vehicle is an unmanned aerial vehicle that flies through the air.

10. The CPP of claim 7 wherein the vehicle is a ground vehicle that travels on wheels over the ground.

11. The CPP of claim 7 wherein the vehicle velocity detection device uses lidar hardware and techniques.

12. The CPP of claim 7 wherein the vehicle-based wind velocity detection device includes uses ultrasonic hardware and techniques.

13. A computer system (CS) for use with a vehicle equipped with a vehicle velocity detection device and a vehicle-based wind velocity detection device, the CS comprising:
- a processor(s) set;
- a set of storage device(s) with each storage device including at least one type of data storage medium; and
- computer code stored collectively in data storage media of the set of storage device(s), with the computer code including data and instructions to cause a processor(s) set to perform at least the following operations:
  - receiving a vehicle-based wind velocity from the vehicle-based wind velocity device,
  - receiving a vehicle velocity from the vehicle velocity detection device,
  - calculating a stationary wind velocity value by vector subtracting the vehicle velocity from the vehicle-based wind velocity, and
  - adjusting driving operations associated with the vehicle utilizing the calculated stationary wind velocity.

14. The CS of claim 13 wherein the vehicle-based wind velocity, the vehicle velocity and stationary wind speed are calculated as two dimensional vectors in a plane parallel to a travel surface upon which the vehicle is travelling.

15. The CS of claim 13 wherein the vehicle is an unmanned aerial vehicle that flies through the air.

16. The CS of claim 13 wherein the vehicle is a ground vehicle that travels on wheels over the ground.

17. The CS of claim 13 wherein the vehicle velocity detection device uses lidar hardware and techniques.

18. The CS of claim 13 wherein the vehicle-based wind velocity detection device includes uses ultrasonic hardware and techniques.

* * * * *